(No Model.)   3 Sheets—Sheet 1.

J. A. POWERS.
OSCILLATING ENGINE.

No. 312,757.   Patented Feb. 24, 1885.

Witnesses:
J. Staib
Chas. H. Smith

Inventor:
Joseph A. Powers
per Lemuel W. Serrell
atty (No Model.) 3 Sheets—Sheet 2.

J. A. POWERS.
OSCILLATING ENGINE.

No. 312,757. Patented Feb. 24, 1885.

Witnesses:
J. Staib
Chr. H. Smith

Inventor:
Joseph A. Powers
per Lemuel W. Serrell
Atty (No Model.)  3 Sheets—Sheet 3.

J. A. POWERS.
OSCILLATING ENGINE.

No. 312,757. Patented Feb. 24, 1885.

Witnesses
J. Staib
Chas H Smith

Inventor
Joseph A Powers
per Lemuel W Serrell
att'y

UNITED STATES PATENT OFFICE.

JOSEPH A. POWERS, OF LANSINGBURG, NEW YORK.

OSCILLATING ENGINE.

SPECIFICATION forming part of Letters Patent No. 312,757, dated February 24, 1885.

Application filed May 5, 1884. (No model.)

*To all whom it may concern:*

Be it known that I, JOSEPH A. POWERS, of Lansingburg, in the county of Rensselaer and State of New York, have invented an Improvement in Oscillating Steam-Engines, of which the following is a specification.

In the ordinary oscillating engine difficulty arises in keeping the parts steam-tight, and the working parts are exposed and subject to wear from dust and dirt.

In my improvement the cylinders are within a steam-chest, and the valves admit the steam directly into the engine-cylinders. The valves are nearly balanced, so that there is very little friction or power required to move them, and the cylinders and moving parts are protected from dust or injury by the steam-chest. The whole of the moving parts, being within the steam-chest, are exposed to an equal temperature, they are not subject to injury in consequence of unequal expansion, and the parts are lubricated by the steam and cannot become heated by friction to a materially higher temperature than the steam.

This engine is especially intended for steam road-wagons and portable cars for railways; but it may also be used for propellers and steam launches and boats.

Figure 1:
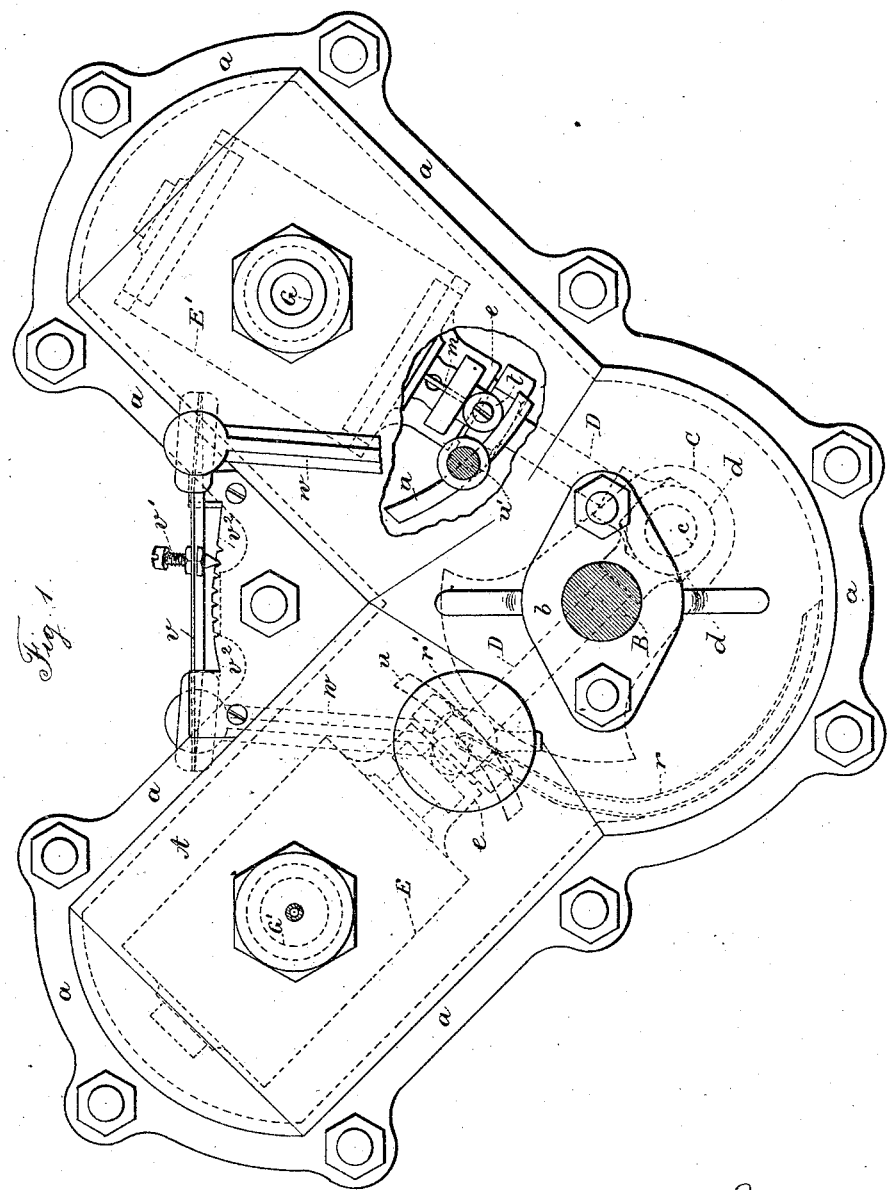
Figure 2:
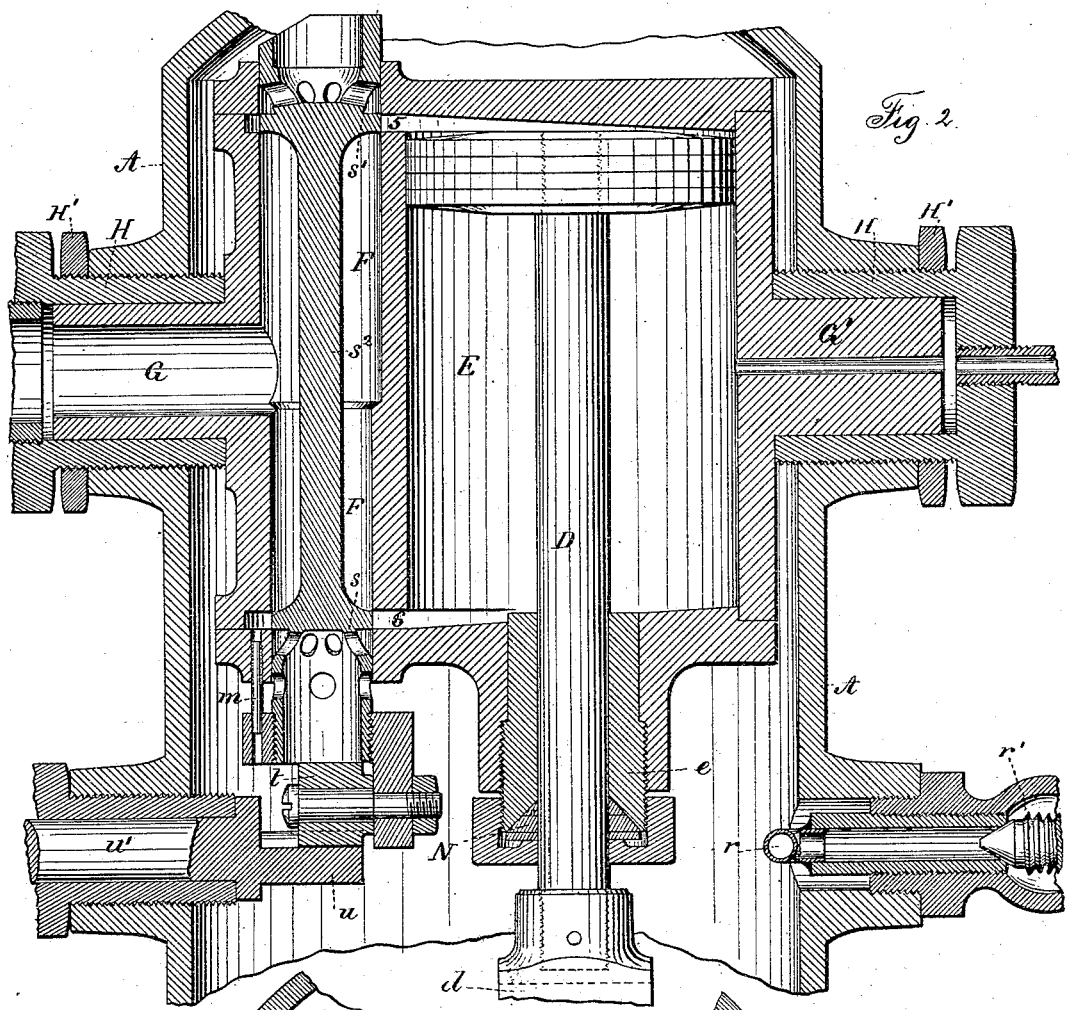
Figure 3:
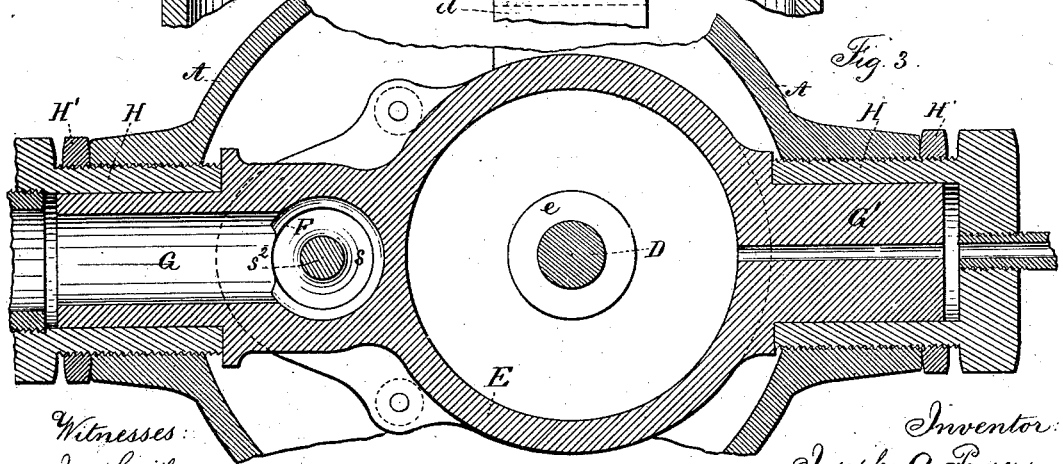
Figure 4:
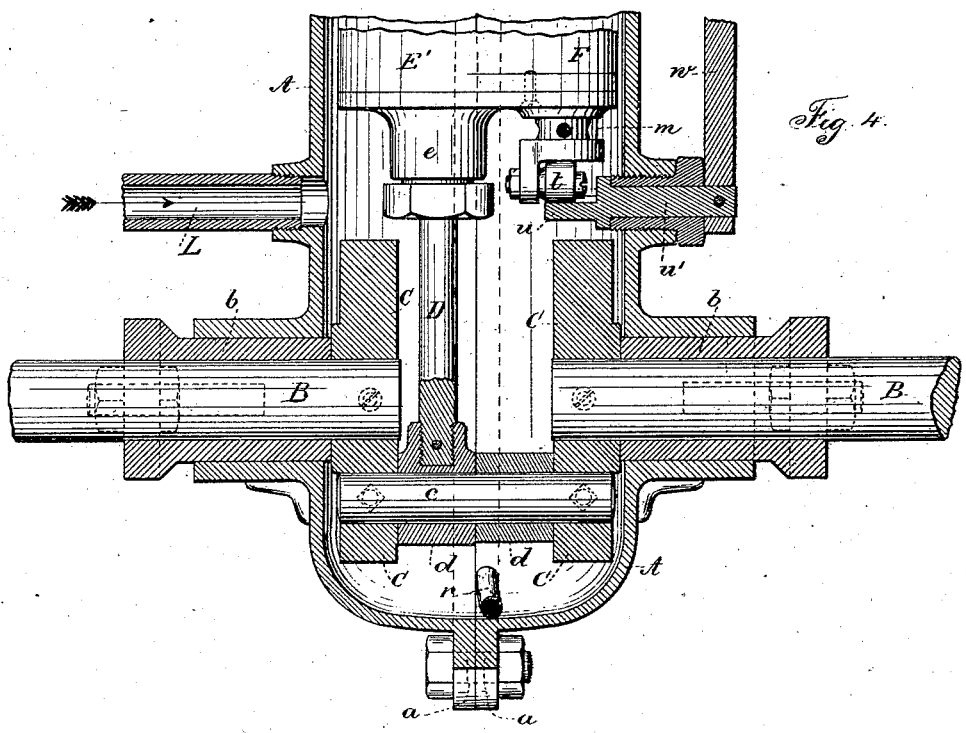

In the drawings, Figure 1 is a side elevation, partially in section. Fig. 2 is a longitudinal section in larger size through the valve-chamber of one cylinder. Fig. 3 is a cross-section, also in larger size, of the cylinder through the trunnions, and Fig. 4 is a longitudinal section of the steam-chest and the crank.

I have shown two cylinders acting at right angles to each other, as this insures uniformity of action; but the improvement may be used on one cylinder, or with two cylinders placed at any other angle.

The case A is made as two half-shells with flanges *a a*, bolted together with suitable packing intervening.

The shaft B passes in through the gland or bearing *b*, and the crank C is within the case. The crank C is preferably balanced by the weighted portion at the opposite side of the shaft, so as to remain in any position where it may be stopped. The crank-pin *c* connects the two parts of the crank, and it is of sufficient length to receive the two boxes *d* of the piston-rods D, that pass through the glands or stuffing-boxes *e* of the cylinders E E', respectively. Each cylinder E or E' has within it a piston of ordinary character, and at one side of such cylinder is a valve-case, F, from which passes a hollow trunnion, G, for the exhaust-steam, and at the opposite side of the cylinder is the other trunnion, G'. These trunnions pass through the bearings or glands H in the steam-chest A.

It is to be understood that the two cylinders and their parts are alike; but they stand so that the exhaust-trunnion of one cylinder passes through one half-shell, and the exhaust-trunnion of the other cylinder passes through the other half-shell. This allows the piston-rods and their end boxes to lie one on one side of a vertical central plane at right angles to the main shaft, and the other at the other side of that plane.

The boxes or glands for the shaft B and trunnions G G' may be of any desired character; but I prefer to employ tubular brass boxes screwed into hubs in the case, the inner ends of the boxes being either flat or conical to fit against the surfaces of the trunnion bases, or against the hub of the crank. Each of these boxes should have a lock-nut, H', so as to hold the same from revolving. By this construction the parts can be kept steam-tight and wear compensated by setting up the tubular boxes from time to time. The boxes may be set up by screw-bolts instead of having a screw-threaded surface. The steam is to be admitted into the case by a pipe, L, and there is to be a stop cock or valve to shut off the steam when necessary. I use a pipe, *r*, passing into the case, and its inner end opening near the lowest point in said case, and to this pipe there is a blow-off cock, *r'*. By this I am enabled to discharge any water of condensation that may accumulate in the case. I prefer to allow sufficient water to remain in the case for the cranks to dip into the same as they revolve, and thereby scatter and splash the water within the case for lubricating the parts, and this action is promoted when oil is supplied so as to float upon such water. The valve of each engine is preferably in the form of two pistons, $s\ s'$, connected by a central rod or bar, $s^2$, and at one end there is a roller, $t$, in a jaw. The steam-ports 5 and 6 pass directly into the ends of the cylinder from the valve-case F. The piston-valve $s'$ is larger than the piston-valve $s$, so that the steam-pressure acting upon $s'$ will move the valve-stem and valves endwise, and tend to press the roller $t$ toward the arc $u$. This arc $u$ should be struck from the center of the trunnions; but it is to be upon a shaft, $u'$, that passes through the steam-chest. By this shaft $u'$ the arc may be swung so as to place it in the desired position. The sizes and positions of the parts are such that if the arc $u$ is placed so as to be in the arc of a circle described from the center of the trunnions the valves $s$ and $s'$ will cover both the ports 5 and 6, and there will not be any end motion given to the valves by the oscillation of the cylinder, as the roller $t$ will be upon a surface that is concentric with the trunnions; but when the arc $u$ is swung into a position that is inclined to the arc described from the trunnions the valve will receive an end motion, opening the steam-port for live steam at one end and the port to the exhaust at the other end. When the arc is inclined in one direction the engine will go around one way, and when inclined in the other direction it will go around the other way. There are crank-arms $w$ upon the outer ends of the respective shafts $u'$, and these are connected by a cross-bar, $v$, so that by means of this cross-bar the arcs $u\ u$ can be rocked or oscillated as required, and when the parts are properly adjusted the engine can be started in either direction, stopped, or reversed instantly by simply moving this bar $v$. When this bar is in a central position, the two arcs $u\ u$—one to each cylinder and valve—are placed and held so as to be concentric with the respective trunnions, and the steam is cut off from both cylinders by the piston-valves covering the respective ports. If the bar $v$ is moved one way, the arcs are both swung into inclined positions, and the lead is such that the engine will be revolved in one direction, and if the arcs are reversed in their inclination then the lead of the valves is such that the engines will revolve the shaft in the other direction; hence the entire control is maintained by a simple connection to this bar $v$. It is usually preferable to make the bar $v$ as a flat spring, through which passes the pointed screw $v'$, and rests upon a short sector-plate, $v^2$, notched in its edge, so that the point of the screw in either of the notches will steady the bar and hold it and the arcs in any position to which they may be moved.

In the drawings the end portions of the valves are shown cylindrical or tubular, with openings for the steam to pass through in reaching the steam-ports. These cylindrical portions serve as guides and lessen the wear upon the piston-valves. I have also shown conical metallic packings at N around the piston-rods at the cylinder-heads. These packings, however, may be of any desired character.

The rollers $t$ may be upon any suitable kind of jaw or support. Usually there will be a rod, $m$, projecting from the end of the valve-case, and passing loosely into a hole in the stock or support for the roller, so as to prevent the valve turning around on its axis. The arc that moves the valve may be grooved or ribbed, so as to act in giving motion in both directions to the valve, and the two valves may be the same size if the arc is grooved, or a spring employed to move the valves endwise.

I claim as my invention—

1. The combination, with the shaft and crank, of two oscillating engines, each engine-cylinder being provided with a valve-chest open at the ends, a valve within the valve-chest, mechanism for operating the same, and trunnions for the cylinder, one of which is hollow to form the exhaust-pipe, and a steam-chest inclosing the engines and crank, and provided with bearings for the crank-shaft and the trunnions, substantially as set forth.

2. The oscillating steam-cylinder and trunnions, and a valve-chest open at both ends, in combination with piston-valves within the chest, one of which is of larger diameter than the other, a roller at the end of the valve, an arc to give motion to such valve, and a steam-case surrounding the engine and its valve-chest, substantially as set forth.

3. The combination, with an oscillating steam-engine cylinder, of a valve-chest open at both ends, a hollow trunnion extending out from such chest, a steam-chest inclosing the cylinder and valve-chest, a valve within the chest, and mechanism for moving such valve, substantially as set forth.

4. The combination, with the cylinder in an oscillating engine, of a valve-chest open at the ends, a piston-valve within that chest, a valve-moving arc, and a steam-case inclosing the cylinder, valve-chest, and valve-moving mechanism, substantially as set forth.

5. The combination, with the oscillating engine and valve, of a steam-chest inclosing the engine, a valve-moving arc within the steam-chest, a shaft passing through the steam-chest for supporting the arc, and a lever outside the case for moving the shaft and arc, substantially as set forth.

6. The combination, with the oscillating engines and the case inclosing the same, of arcs to move the engine-valves within the steam-case, shafts from such arcs extending through the case, levers upon the shafts, and a connection between the levers, substantially as set forth.

7. The combination, with the oscillating engine, of a steam-case surrounding the engine and crank, bearings for the trunnions and engine-shaft, such bearings passing through the case and pressing at their ends against the metal around the shaft and trunnions, respectively, and a screw to set up the bearing, substantially as set forth.

Signed by me this 25th day of April, A. D. 1884.

J. A. POWERS.

Witnesses:
GEO. T. PINCKNEY,
WILLIAM G. MOTT.